(12) United States Patent
Takahashi

(10) Patent No.: US 12,518,354 B2
(45) Date of Patent: Jan. 6, 2026

(54) IMAGE PROCESSING APPARATUS, RADIATION IMAGING SYSTEM, IMAGE PROCESSING METHOD, AND COMPUTER-READABLE MEDIUM THAT CORRECT A TARGET PIXEL IN A RADIATION IMAGE

(71) Applicant: CANON KABUSHIKI KAISHA, Tokyo (JP)

(72) Inventor: Naoto Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 687 days.

(21) Appl. No.: 17/940,289

(22) Filed: Sep. 8, 2022

(65) Prior Publication Data

US 2023/0083801 A1 Mar. 16, 2023

(30) Foreign Application Priority Data

Sep. 10, 2021 (JP) ................................ 2021-147757

(51) Int. Cl.
*G06T 5/70* (2024.01)
*G06T 5/77* (2024.01)

(52) U.S. Cl.
CPC . *G06T 5/70* (2024.01); *G06T 5/77* (2024.01)

(58) Field of Classification Search
CPC ........................ G06T 5/70; G06T 2207/10116
See application file for complete search history.

(56) References Cited

U.S. PATENT DOCUMENTS

2019/0146103 A1* 5/2019 Ofuji ..................... H04N 23/30
250/370.08

FOREIGN PATENT DOCUMENTS

| JP | 2011249891 A | | 12/2011 | |
|---|---|---|---|---|
| JP | 2014150844 A | | 8/2014 | |
| JP | 2014198147 A | | 10/2014 | |
| JP | 2015080518 A | * | 4/2015 | ........... A61B 6/4233 |
| JP | 2019-091969 A | | 6/2019 | |
| WO | WO-2011013390 A1 | * | 2/2011 | ........... A61B 6/4233 |

OTHER PUBLICATIONS

Office Action issued on Aug. 1, 2023, in corresponding Japanese Patent Application No. 2021-147757, with English translation (15 pages).

* cited by examiner

*Primary Examiner* — Sumati Lefkowitz
*Assistant Examiner* — Michael Adam Shariff
(74) *Attorney, Agent, or Firm* — Venable LLP

(57) ABSTRACT

An image processing apparatus corrects a target pixel in a radiation image using a radiation detector including a pixel region in which pixels detect radiation in a matrix. The apparatus includes a memory coupled to a processor. Instructions in the memory cause the processor to function as a pixel determination unit to determine a reference pixel from among four pixels vertically and horizontally adjacent to the correction target pixel in the radiation image. A pixel correcting unit corrects the correction target pixel in the radiation image using the reference pixel. The radiation detector obtains the radiation image by repeating reading out a charge accumulated in the pixels of one of an odd column and an even column of a first row and reading out a charge accumulated in the pixels of the other of the odd column and the even column of a second row adjacent to the first row.

14 Claims, 13 Drawing Sheets

COLUMN
LINE GRAPH IN COLUMN DIRECTION

ROW
LINE GRAPH IN ROW DIRECTION

RATIO OF OUTPUT VALUES

RATIO OF OUTPUT VALUES (ORTHOGONAL TO GRID STRIPE)

IMAGE PROCESSING APPARATUS, RADIATION IMAGING SYSTEM, IMAGE PROCESSING METHOD, AND COMPUTER-READABLE MEDIUM THAT CORRECT A TARGET PIXEL IN A RADIATION IMAGE

CROSS-REFERENCE TO PRIORITY APPLICATION

This application claims the benefit of Japanese Patent Application No. 2021-147757, filed Sep. 10, 2021, which is hereby incorporated by reference herein in its entirety.

BACKGROUND OF THE INVENTION

Field of the Invention

The present invention relates to an image processing apparatus for performing image processing of a radiation image, a radiation imaging system including the image processing apparatus, an image processing method executed by the image processing apparatus, and a computer-readable medium having stored thereon a program that causes a computer to execute the image processing method.

Description of the Related Art

In recent years, a Flat Panel Detector (FPD), which is a radiation detector that accumulates a radiation such as x-rays as a charge signal and converts the charge signal into a digital signal to provide a diagnostic image (radiation image), has been put into practical use and has been actively used. Although such a radiation imaging apparatus has been formed integrally with a modality and configured as a dedicated device, there are many market-requests that it is desired to replace an imaging unit such as a film or an imaging plate of an existing modality with the FPD.

In a case when it is desired to replace the imaging unit of the existing modality with the FPD, it may be difficult to construct an interface between a radiation generating apparatus and the FPD. As a method for handling this matter, Japanese Patent Application Laid-Open No. 2011-249891 proposes an FPD that detects irradiation of a radiation on the FPD side and automatically starts an accumulation operation of charges (charge signals) without providing an interface between the radiation generation apparatus and the FPD.

As described above, in a case when the FPD detects the irradiation of the radiation and automatically starts the charge accumulation operation, the irradiation of a certain amount of the radiation is necessary until the radiation is detected and the charge accumulation operation is started, and the reset operation is performed during the irradiation. For this reason, the charge due to the radiation irradiated up to the start of the charge accumulation operation is discharged, and the discharged charge cannot contribute to the output value relating to a radiation image. Therefore, there is a problem in that a difference occurs in the output values relating to the radiation image between a pixel from which the charges have been discharged (hereafter, this pixel is referred to as "defect pixel") and a pixel from which the charges have not been discharged (hereinafter, this pixel is referred to as "normal pixel") even if the doses of the radiation incident on the pixels are the same.

For example, in Japanese Patent Application Laid-Open No. 2011-249891, the reset operation at the time of radiation detection is performed for each one row, and the reset operation is performed for even rows or odd rows which are switched each other for each frame. Therefore, in Japanese Patent Application Laid-Open No. 2011-249891, the charges are discharged on alternate rows from the irradiation of the radiation to the start of the charge accumulation operation. As a result, in Japanese Patent Application Laid-Open No. 2011-249891, there is a problem that rows from which charges have been discharged (hereafter, this row is referred to as "defect row") and rows from which charges have not been discharged (hereafter, this row is referred to as "normal row") alternately occur, and a difference in output values between those rows appears in a stripe pattern on the radiation image. For solving the problem, Japanese Patent Application Laid-Open No. 2011-249891 discloses a method of discarding data of the defect row as defects and correcting the defects by linear interpolation of surrounding pixels.

As a method other than the above, a method described in Japanese Patent Application Laid-Open No. 2014-198147 may be mentioned. Specifically, in the method disclosed in Japanese Patent Application Laid-Open No. 2014-198147, a defect rate of a radiation in a defect row is determined from the defect row and a normal row adjacent to the defect row, and the output value is digitally amplified according to the defect rate. In the method disclosed in Japanese Patent Application Laid-Open No. 2014-198147, more suitable correction results can be obtained because information of the defect row can be effectively utilized compared with the method disclosed in Japanese Patent Application Laid-Open No. 2011-249891 in which the data of the defect row is discarded as a defect.

By the way, since the radiation generates a scattered radiation in an object to be examined, the scattered radiation is imaged as well as a direct radiation that passed through the object to be examined. Therefore, there are cases when an instrument called a grid for removing such a scattered radiation is placed between the object to be examined and a radiation receiving surface of the radiation detector to perform imaging.

The grid is constituted by alternately arranging a radiation shielding material such as lead and a radiotransparent material such as aluminum or carbon with a predetermined width to remove the scattered radiation. At this time, since the grid removes a part of the direct radiation passing through the radiation shielding material, the grid generates a periodic signal (also called a grid stripe) on the image.

In the method disclosed in Japanese Patent Application Laid-Open No. 2011-249891, for example, when the grid is arranged under a condition that a direction of the grid stripe and a direction of a scanning line of the radiation detector are parallel to each other, a direction of the stripe occurring when the radiation is automatically detected and the direction of the grid stripe coincide with each other. In this case, there is a probability in which both stripes cannot properly be corrected due to interference of the both stripes and an image quality of the radiation image deteriorates by performing the correction. This problem can be solved by positioning the grid so that the direction of the grid stripe and the direction of the scanning line of the radiation detector are perpendicular to each other. However, there is a probability in which the grid is misplaced, and, in this case, the correction cannot be performed properly. Further, there are also cases when the grid cannot be arranged in such a manner due to installation restrictions.

The method of Japanese Patent Application Laid-Open No. 2014-198147 discloses a method of reducing the influence by previously removing, by frequency processing, a component such as the grid stripe having probability that the component interferes with the stripe occurring when the radiation is automatically detected. However, it is difficult, in principle, to completely separate and remove component such as the grid stripe having a frequency close to a frequency of the stripe occurring when the radiation is automatically detected, and interfering with the stripe. Therefore, in the method disclosed in Japanese Patent Application Laid-Open No. 2014-198147, there are cases in which sufficient correction accuracy cannot be obtained due to the considerable influence of the grid stripe.

SUMMARY OF THE INVENTION

An aspect of the present invention has been made in view of such a problem, and has an object to provide a mechanism for accurately correcting the defect pixel occurring when the irradiation of the radiation is automatically detected and the radiation image is obtained, without being affected by the grid stripe.

A image processing apparatus according to an aspect of the present invention is an image processing apparatus performing a processing of correcting a correction target pixel in a radiation image by using a radiation detector that includes a pixel region in which a plurality of pixels configured to detect a radiation are provided in a matrix, and that is configured to obtain the radiation image by alternately reading out a charge accumulated in a pixel in an odd column or a pixel in an even column in each row of the pixel region, the image processing apparatus comprising a pixel determination unit configured to determine a reference pixel from among four pixels vertically and horizontally adjacent to the correction target pixel in the radiation image, and a pixel correcting unit configured to correct the correction target pixel in the radiation image using the reference pixel.

The present invention also includes a radiation imaging system including the image processing apparatus described above, an image processing method executed by the image processing apparatus described above, and a computer readable medium having stored thereon a program for causing a computer to execute the respective steps of the image processing method described above.

Further features of the present invention will become apparent from the following description of exemplary embodiments with reference to the attached drawings.

DESCRIPTION OF THE EMBODIMENTS

Hereafter, modes (embodiments) for carrying out the present invention will be described with reference to the drawings.

First Embodiment

First, a first embodiment of the present invention will be described.

Figure 1:
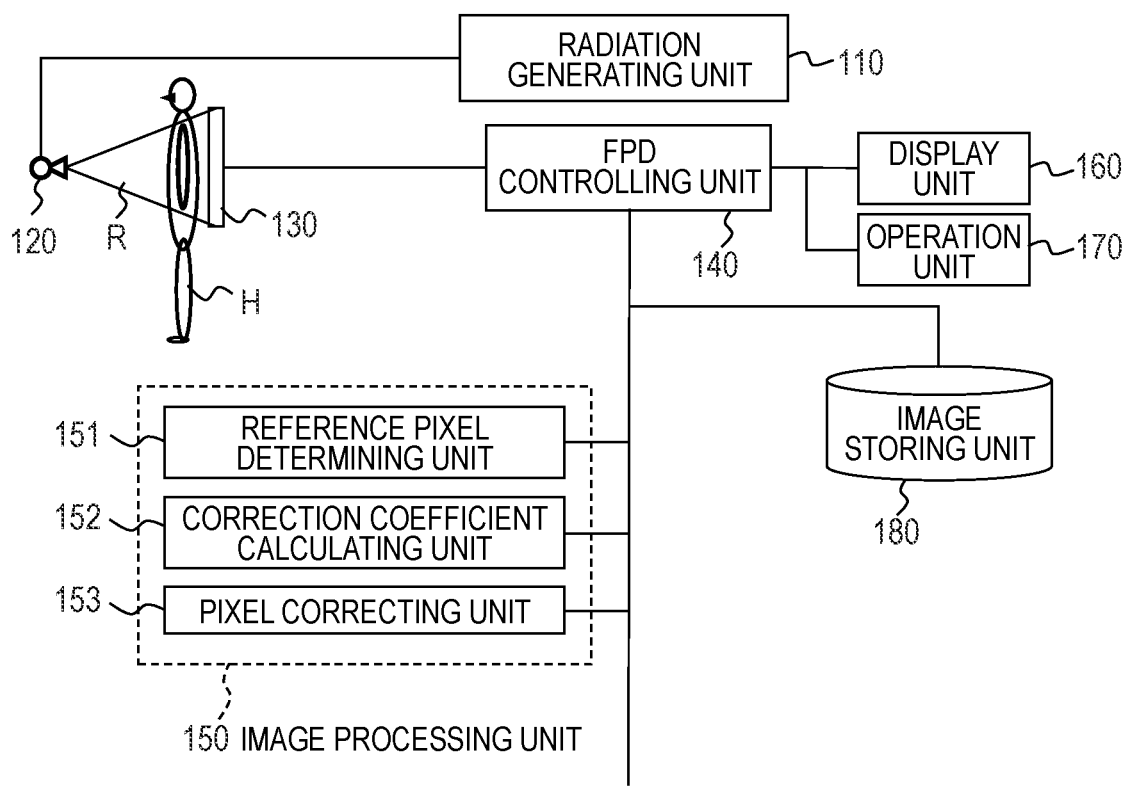
FIG. 1 is a diagram for illustrating an example of a schematic configuration of a radiation imaging system according to a first embodiment of the present invention.

FIG. 1 is a diagram for illustrating a schematic configuration of a radiation imaging system 100 according to a first embodiment of the present invention. Here, the radiation imaging system 100 according to the first embodiment shown in FIG. 1 is referred to as "radiation imaging system 100-1".

The radiation imaging system (radiation imaging apparatus) 100-1 includes, as shown in FIG. 1, a radiation generating unit 110, a radiation source 120, an FPD 130, an FPD controlling unit 140, an image processing unit 150, a display unit 160, an operation unit 170, and an image storing unit 180.

The radiation imaging system 100-1 shown in FIG. 1 is a system having the image processing unit 150 for correcting a defect pixel occurring when the FPD 130, which is a radiation detector, automatically detects irradiation of a radiation R to obtain a radiation image.

The radiation generating unit 110 provides a high voltage pulse to the radiation source 120 in accordance with a pressing of an irradiation switch (not shown) to generate the radiation R from the radiation source 120. The radiation source 120 irradiates the radiation R towards an object to be examined H under control by the radiation generating unit 110. In first embodiment, the radiation generating unit 110 and the radiation source 120 constitute a radiation generating apparatus.

Under the control of the FPD controlling unit 140, the FPD 130 detects an incident radiation R (including the radiation R that has passed through the object to be examined H) as an electric charge, which is an electric signal, in a conversion element of each pixel. Here, the conversion element may include, for example, a scintillator for converting the incident radiation R into visible light, and a photodiode for detecting the visible light generated by the scintillator as the electric charge, which is the electric signal. Note that the conversion element may be, for example, a direct conversion type conversion element that directly converts the incident radiation R into the electric charge, which is the electric signal. The FPD 130 performs AD conversion on the electric signals detected by the conversion elements of the respective pixels, and then transmits the converted signals to the FPD controlling unit 140.

The FPD controlling unit 140 performs processing such as processing for controlling the operation of the FPD 130. The image processing unit 150, the display unit 160, the operation unit 170 and the image storing unit 180 are electrically connected to the FPD controlling unit 140, and one or more computers are built in the FPD controlling unit 140. For example, a main controlling unit such as a CPU, or a storage unit such as a ROM (Read Only Memory) or a RAM (Random Access Memory) may be included in the computer built in the FPD controlling unit 140. Further, the computer may include a graphic controlling unit such as a GPU (Graphics Processing Unit), a communication unit such as a network card, and an input/output unit such as a keyboard, a display, or a touch panel. Each of the components of the computer described here is connected by a bus, or the like, and they are controlled by executing a program stored in the storage unit by the main controlling unit.

The image processing unit 150 is an image processing apparatus that performs processing for correcting a defect pixel occurring due to a time difference up to the detection of the radiation R with respect to the radiation image obtained by the FPD 130, which is a radiation detector. As shown in FIG. 1, the image processing unit 150 includes a reference pixel determining unit 151, a correction coefficient calculating unit 152, and a pixel correcting unit 153. The reference pixel determining unit 151 is a pixel determining unit for determining a reference pixel from among four pixels vertically and horizontally adjacent to a correction target pixel, which has a probability of becoming (may become) the defect pixel described above, in the radiation image obtained by the FPD 130. The correction coefficient calculating unit 152 is a calculation unit for calculating a correction coefficient using the reference pixel determined by the reference pixel determining unit 151. The pixel correcting unit 153 is a pixel correcting unit for correcting the correction target pixel that may become the defect pixel in the radiation image obtained by the FPD 130 using the correction coefficient calculated by the correction coefficient calculating unit 152.

The display unit 160 displays the radiation image of a received digital signal or a digital signal processed by the image processing unit 150. The operation unit 170 is operated by an operator when inputting information to the radiation imaging system 100-1, for example, and inputs an instruction to the image processing unit 150 and the FPD 130. The image storing unit 180 stores digital signals output from the FPD controlling unit 140 and image data of the radiation image processed by the image processing unit 150.

The operation of the characteristic portions of the first embodiment in the radiation imaging system 100-1 having the above-described configuration will be specifically described with reference to the flowchart shown in FIG. 2. Specifically, FIG. 2 is a flowchart showing an example of a processing procedure in a control method of the radiation imaging system 100 according to the first embodiment of the present invention.

Figure 2:
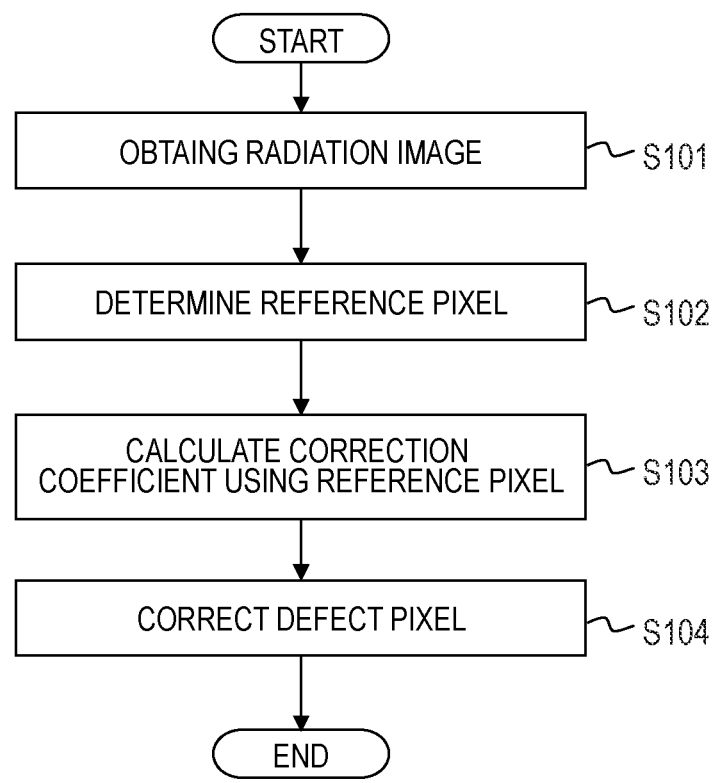
FIG. 2 is a flowchart showing an example of a processing procedure in a control method of the radiation imaging system according to the first embodiment of the present invention.

First, in step S101 in FIG. 2, the radiation generating unit 110 applies the high voltage pulse to the radiation source 120 when the irradiation switch (not shown) is depressed, and the radiation source 120 irradiates the radiation R toward the object to be examined H. After the irradiation of the radiation R by the radiation source 120 is started, the FPD 130 automatically detects the irradiation of the radiation R to start a charge accumulation operation in each pixel to obtain the radiation image.

The drive for automatically detecting the irradiation of the radiation R will be specifically described with reference to FIG. 3 to FIG. 5.

Figure 3:
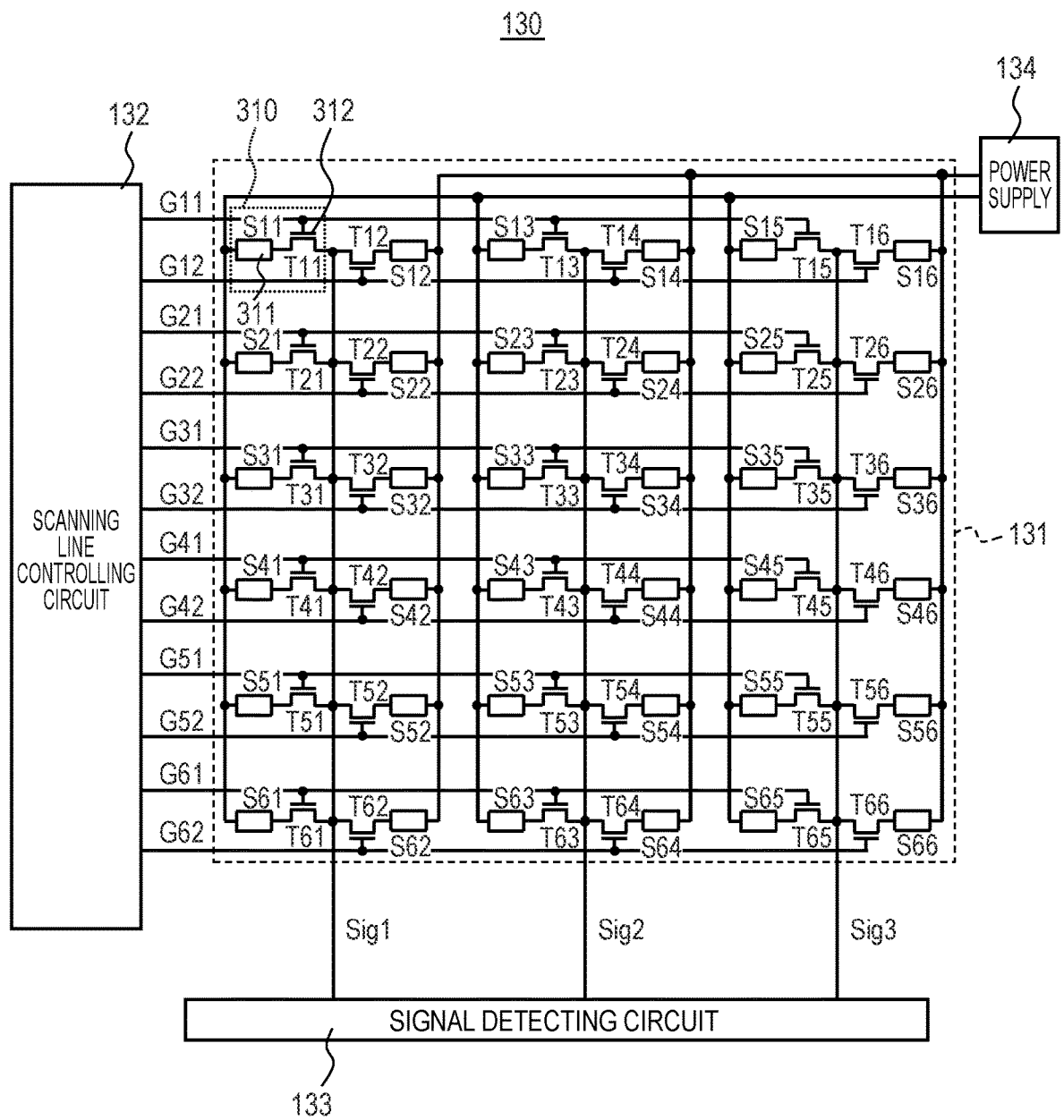
FIG. 3 is a diagram for illustrating an example of an internal configuration of a FPD shown in FIG. 1.

FIG. 3 is a diagram for illustrating an example of an internal configuration of the FPD 130 shown in FIG. 1. As shown in FIG. 3, the FPD 130 includes a pixel region 131, a scanning line controlling circuit 132, a signal detecting circuit 133, and a power supply 134.

The pixel region 131 is a region in which a plurality of pixels 310 for detecting the radiation R are provided in a matrix. Although the pixel region 131 in the example shown in FIG. 3 includes six pixels 310 in both of a row direction and a column direction, it is actually composed of thousands of pixels 310 in both of the row direction and the column direction. Further, each pixel 310 includes, for example, the above-described conversion element 311 having the scintillator and the photodiode and a switch element 312 having a TFT, on a glass substrate.

The scanning line controlling circuit 132 sequentially applies ON signals to scanning lines G11 to G62 under the control by the FPD controlling unit 140 to turn on the switch element 312. When the scanning line controlling circuit 132 applies the ON signal to each of the scanning line G11 to G62, the switch elements 312 are turned on, and the charges stored in the conversion elements 311 of pixels 310 in odd columns or pixels 310 in even columns in each row of the pixel region 131 can be read out alternately. For example, if the switch elements 312 connected to the scanning line G11 are turned on, the charges stored in the conversion elements S11, S13 and S15 of the pixels 310 in the odd columns in the first row can be read out. Further, for example, if the switch elements 312 connected to the scanning line G12 are turned on, the charges stored in the conversion elements S12, S14 and S16 of the pixels 310 in the even columns in the first row can be read out.

The electric signal based on the electric charges from the conversion elements 311 are read out to the signal detecting circuit 133 via the signal lines Sig1 to Sig3. The signal detecting circuit 133 outputs the read electric signals to the FPD controlling unit 140 as a radiation image of digital signals through processing such as holding, amplification and AD conversion. The power supply 134 supplies an operating voltage to the conversion element 311 of each pixel 310.

As described above, the FPD 130 is a radiation detector that includes a pixel region 131 in which the plurality of pixels 310 for detecting the radiation R are provided in a matrix, and alternately reads out the electric charges accumulated in the pixels of the odd columns or the pixels of the even columns in each row of the pixel region 131 to obtain the radiation image.

Figure 4:
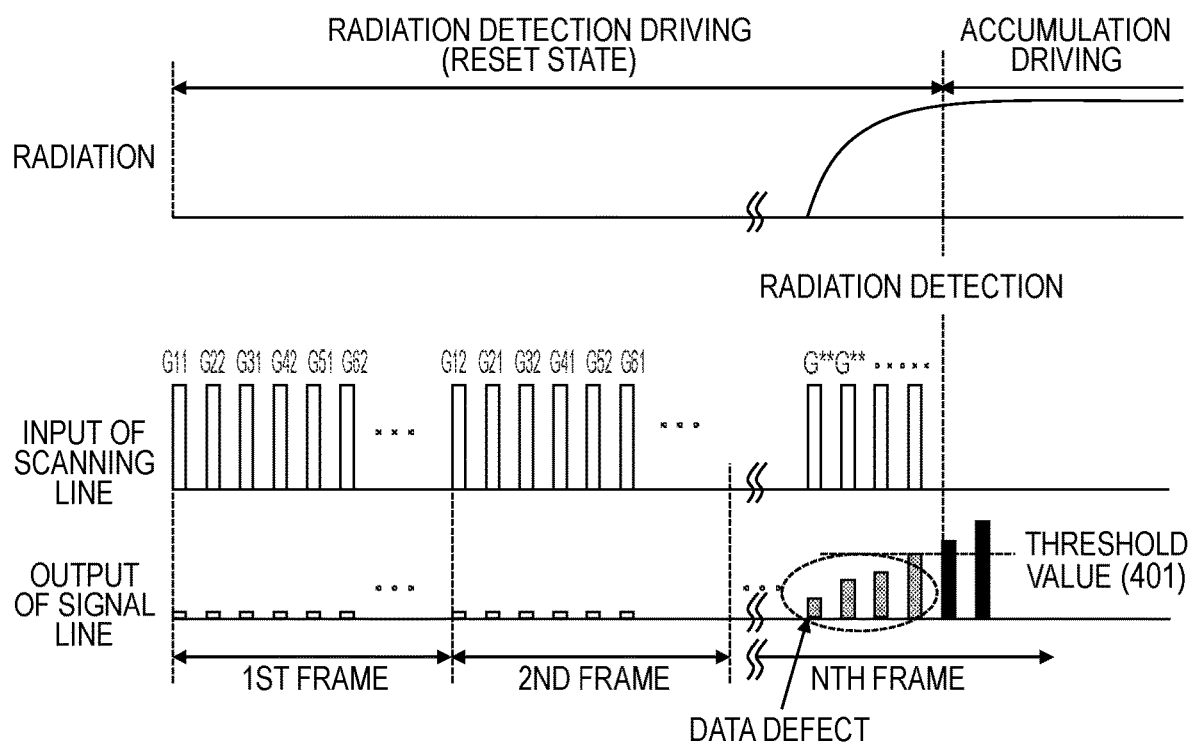
FIG. 4 is a diagram for illustrating an example of driving timing of the FPD shown in FIG. 3.

FIG. 4 is a diagram for illustrating an example of a driving timing of the FPD 130 shown in FIG. 3.

As shown in FIG. 4, when the radiation R is not irradiated, the FPD 130 waits in radiation detection driving (a reset state). At this time, in the first frame, the scanning line controlling circuit 132 sequentially drives the pixels while switching between the pixels 310 in the odd columns and the pixels 310 in the even columns for each row via the scanning lines, such as the scanning lines G11, G22, G31, G42, G51, G62, . . . . Then, the FPD 130 reads out the dark charges in the pixels 310 connected to the driven scanning lines G11, G22, G31, G42, G51, G62, . . . , via the signal lines Sig1 to Sig3 by the signal detecting circuit 133, and resets them.

In the next second frame, the scanning line controlling circuit 132 sequentially drives the pixels 310 in the columns opposite to (other than) ones driven in the first frame for each row via the scanning lines, such as scanning lines G12, G21, G32, G41, G52, G61, . . . . Then, the FPD 130 reads out the dark charges in the pixels 310 connected to the driven scanning lines G12, G21, G32, G41, G52, G61, . . . , via the signal lines Sig1 to Sig3 by the signal detecting circuit 133, and resets them.

The FPD 130 performs the same drive as the drive for the first frame in odd frames and the same drive as the drive for the second frame in even frames while alternately repeating this operation, and prepares for the irradiation of the radiation R.

Here, the signal detecting circuit 133 monitors the reset charge in order to detect the irradiation of radiation R. When the radiation R is irradiated, an electric charge is generated by the conversion element 311, and the outputs of the signal lines Sig1 to Sig3 increase. When this output exceeds a predetermined threshold value (threshold value 401 shown in FIG. 4), it is assumed that the radiation R is irradiated, and all switch elements 312 are turned off to start accumulation driving of the electric charge.

Note that the lower the threshold value 401, the faster the irradiation of radiation R can be detected. However, it is necessary to set the threshold value to a relatively large value in consideration of malfunction due to noise, or the like. Therefore, there is a time lag from the start of the irradiation with the radiation R to the detection of the irradiation of the radiation R. As a result, the charge according to the radiation R irradiated up to the accumulation driving of the charge is started cannot contribute to the output value relating to the radiation image, and the value becomes less than the pristine output value.

Figure 5:
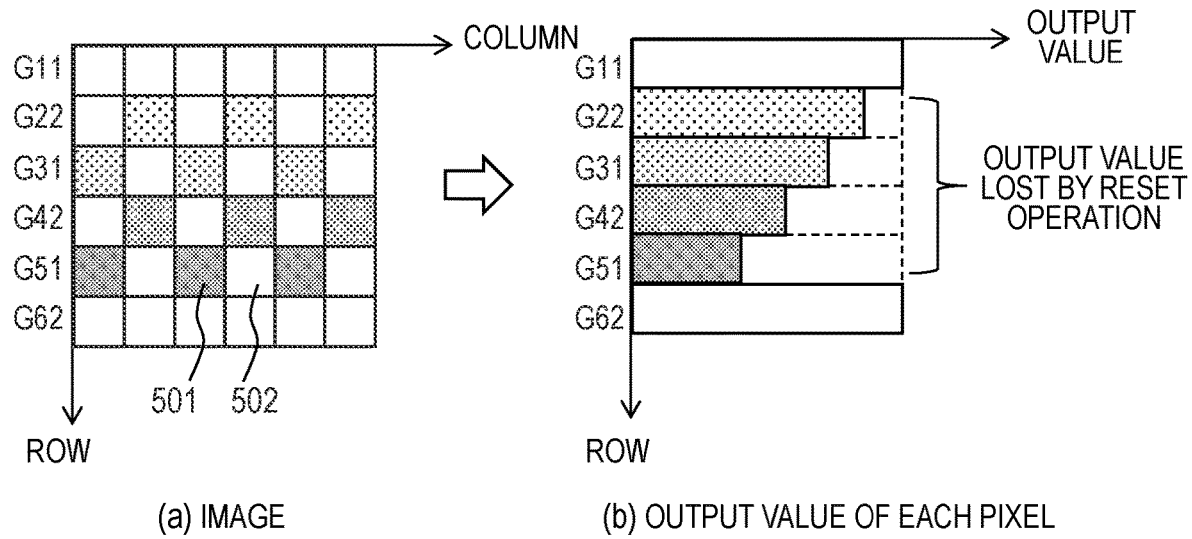
FIG. 5 is a diagram for illustrating the first embodiment of the present invention, and explaining decrease in an output value relating to a radiation image when a uniform radiation is irradiated.

FIG. 5 shows the first embodiment of the present invention, and is a diagram for explaining the decrease in the output value relating to the radiation image when a uniform radiation R is irradiated. Here, an image (a) of FIG. 5 is a diagram in which one rectangle is represented as one pixel 310 shown in FIG. 3. A graph (b) in FIG. 5 is a diagram for illustrating the output values of the pixels 310 connected to the scanning lines G11, G22, G31, G42, G51, and G62 in each row shown in the image (a) of FIG. 5, in the form of a bar graph.

In a case when the uniform radiation R is irradiated, the output value of each pixel 310 is substantially the same if there is no time lag up to the detection of the irradiation of the radiation R. In FIG. 5, it is assumed that the irradiation of the radiation R is started when the scanning line G22 is driven, and the irradiation of the radiation R is detected when the scanning line G51 is driven. In the image (a) of FIG. 5, the pixel 310 with the background color is shown as a defect pixel 501, and the white pixel 310 is shown as a normal pixel 502.

In this case, as shown in the graph (b) of FIG. 5, the output values of the pixels 310 connected to the scanning lines G22, G31, G42, G51 for which the reset operation has been performed are smaller than the pristine output values. The decrease in the output value depends on a time lag from the start of the irradiation of the radiation R to the performance of the reset operation, and the longer the time lag, the greater the decrease in the output value. Therefore, in the operation of the first embodiment, since the reset operation is sequentially performed from the scanning line G11, the decrease in the output value becomes greater according to the progress of the operation from the scanning line G22 when the irradiation of the radiation R starts to the scanning lines G31, G42, G51, as shown in the graph (b) of FIG. 5. Further, the decrease in the output value described above depends on an imaging-condition. For example, as the radiation dose of the irradiated radiation R is greater, a proportion that the electric charge discharged for detecting the irradiation of the radiation R contributes to the output value becomes lesser. Therefore, in some cases, the amount of the decrease becomes a level that is visually negligible (correction of the defect pixel 501 is not required) according to the imaging-condition.

The image data of the radiation image obtained by the above-described operation is transferred to the image processing unit 150 via the FPD controlling unit 140, and the defect pixel 501, which is a pixel having a reduced output value, is corrected. Note that the scanning line that is being driven when the irradiation of radiation R is detected is known. Therefore, a correction target pixel which may become the defect pixel 501 can be identified by tracing the driven scanning line backward. Therefore, the correction processing to be described below is performed only for the correction target pixel that may become the defect pixel 501.

Here, the basic concept of the correction will be described before the specific description of the correction. First, a normal output value V of each pixel (hereafter, the output value of each pixel may be referred to as pixel value) is determined by the sum of a gain component proportional to a radiation dose X of the radiation R incident on the pixel and an offset component D caused by the dark current and the like. In a case when a proportional constant is represented as A, the relationship between the pixel value V and the radiation dose X is expressed by the following expression (1).

$$V = A \cdot X + D \qquad (1)$$

On the other hand, in a pixel value $V_d$ of the defect pixel, a part of the radiation dose X incident on the pixel is lost by the reset operation, and the radiation dose contributing to the pixel value decreases by a factor of 1/G. Therefore, the relationship between the pixel value Va of the defect pixel and the radiation dose X is expressed by the following expression (2).

$$V_d = A \cdot \frac{X}{G} + D \qquad (2)$$

Therefore, according to the expressions (1) and (2), the relationship between pixel value $V_d$ of the defect pixel and the pristine pixel value V is expressed the following expression (3). If coefficients G and D shown in expression (3) can be estimated as correction coefficient, the pixel value $V_d$ of the defect pixel can be corrected to the pristine pixel value V.

$$V=G \cdot (V_d-D)+D \quad (3)$$

Here, the estimation of the coefficients G and D shown in the expression (3) can be performed, for example, by the least-squares method. However, in this case, the dependent variable V corresponding to the independent variable Va, that is, the pristine pixel value V is required. Therefore, assuming that "neighboring pixels adjacent to each other have similar pixel values," the coefficients G and D shown in expression (3) are calculated by using the value of the normal pixel 502 adjacent to the defect pixel 501 as an approximate value of the pristine pixel value V.

Note that the above-described method assumes that "neighboring pixels adjacent to each other have similar pixel values", and, if this assumption cannot be held, that is, "neighboring pixels adjacent to each other do not have similar pixel values," the estimation errors of the coefficients G and D become large and the correction with high accuracy cannot be performed as a matter of course. Therefore, when the above-described method is used, it is important how to select a neighboring pixel that has similar pixel value.

The basic concept of the correction in first embodiment has been described above. A specific correction method will be described below.

Here, the description returns to FIG. 2. If the radiation image obtainment is completed in step S101 in FIG. 2, the process proceeds to step S102 in FIG. 2. If the process proceeds to step S102 in FIG. 2, the reference pixel determining unit 151 determines a reference pixel for determining the dependent variable V from among the four pixels vertically and horizontally adjacent to the correction target pixel that may become the defect pixel in the radiation image obtained in step S101. As described above, the dependent variable V must be determined from a pixel having a pixel value similar to the pixel value of the defect pixel that is a correction target pixel. However, in a case when the imaging is performed while the grid is mounted at the predetermined position described above, the similar pixel value is not obtained in a pixel in a direction orthogonal to the grid stripe even if the pixel is the neighboring pixel.

Figure 6A:
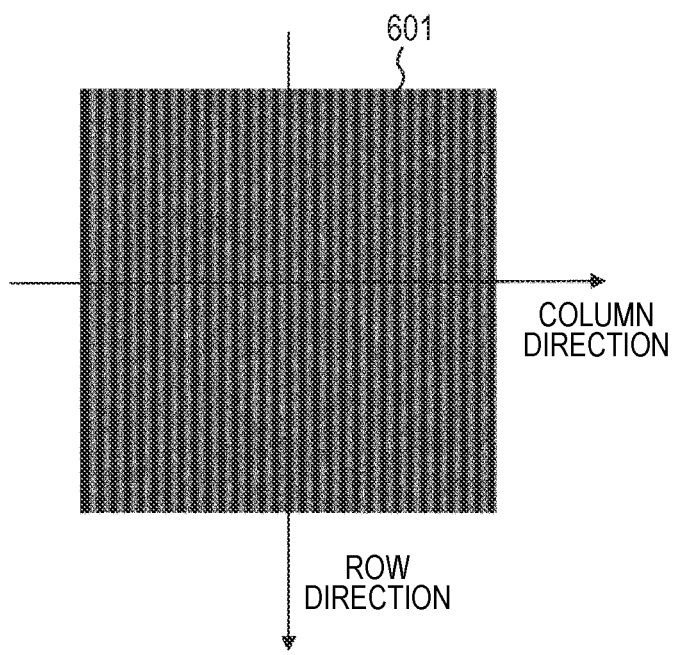
FIG. 6A is a diagram for illustrating an example of variation in pixel values in a case when a grid is mounted on the radiation imaging system according to the first embodiment of the present invention.
Figure 6B:
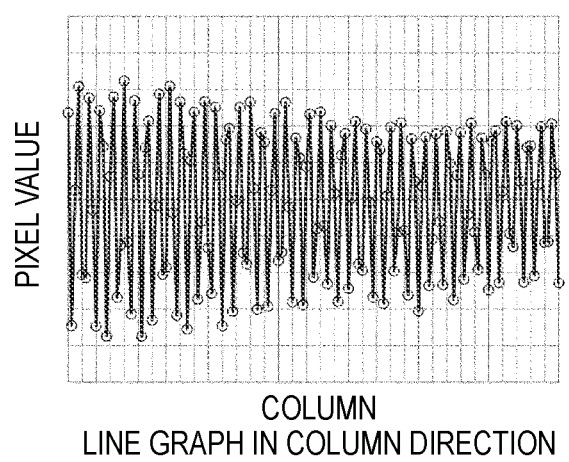
FIG. 6B is a diagram for illustrating the example of the variation in the pixel values in the case when the grid is mounted on the radiation imaging system according to the first embodiment of the present invention.
Figure 6C:
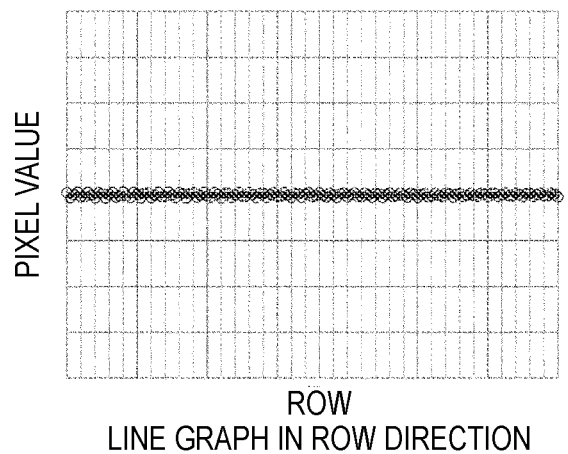
FIG. 6C is a diagram for illustrating the example of the variation in the pixel values in the case when the grid is mounted on the radiation imaging system according to the first embodiment of the present invention.

FIG. 6A to FIG. 6C are diagrams for illustrating an example of variation in the pixel values in a case when the grid is mounted on the radiation imaging system 100 according to the first embodiment of the present invention. FIG. 6A shows a case when a grid stripe 601 is in a vertical direction (row direction), FIG. 6B is a line graph in a horizontal direction (column direction) orthogonal to the grid stripe 601, and FIG. 6C is a line graph in the vertical direction (row direction) parallel to the grid stripe 601. In the horizontal direction (column direction) orthogonal to the grid stripe 601, lead having a high absorption rate of the radiation R and aluminum having a low absorption rate of the radiation R are alternately disposed, so that the pixel values vary greatly as shown in FIG. 6B. On the other hand, as shown in FIG. 6C, in the vertical direction (row direction) parallel to the grid stripe 601, the variation of the pixel values as shown in FIG. 6B does not occur.

Therefore, the reference pixel determining unit 151 determines a neighboring pixel in a direction parallel to grid stripe 601 (the vertical direction (row direction) in the example shown in FIG. 6A to FIG. 6C) as the reference pixel. Specifically, in the radiation automatic detection according to the first embodiment, as shown in the image (a) of FIG. 5, the normal pixel 502 always exists in four-neighbor (four adjacent pixels in the vertical and horizontal directions) of the defect pixel 501. Therefore, in a case when the grid stripe 601 occurring in the radiation image is in the vertical direction, the reference pixel determining unit 151 determines a first pixel group (two pixels in the vertical direction) that is vertically adjacent to the correction target pixel, which may become the defect pixel 501, as the reference pixels. Further, in a case when the grid stripe 601 occurring in the radiation image is in the horizontal direction, the reference pixel determining unit 151 determines a second pixel group (two pixels in the horizontal direction) that is horizontally adjacent to the correction target pixel, which may become the defect pixel 501, as the reference pixels. That is, the reference pixel determining unit 151 determines, as the reference pixels, a pixel group having a small difference in the pixel values from the correction target pixel, which may become the defect pixel 501, from between the first pixel group (two pixels in the vertical direction) and the second pixel group (two pixels in the horizontal direction). Note that, in a case when the grid is not mounted, that is, in a case when the grid stripe 601 does not exist in the radiation image, either pixel group of the first pixel group and the second pixel group described above may be determined as the reference pixels.

Note that, as a specific method for detecting the grid stripe 601 occurring in the radiation image, a method disclosed in Japanese Patent Application Laid-Open No. 2014-150844, which has already been filed by the present applicant, can be used. In the method disclosed in Japanese Patent Application Laid-Open No. 2014-150844, the grid stripe 601 is detected by comparing power spectra in a determined measurement region. The details of the method are known in Japanese Patent Application Laid-Open No. 2014-150844, and, therefore, a description thereof is omitted here.

Figure 7:
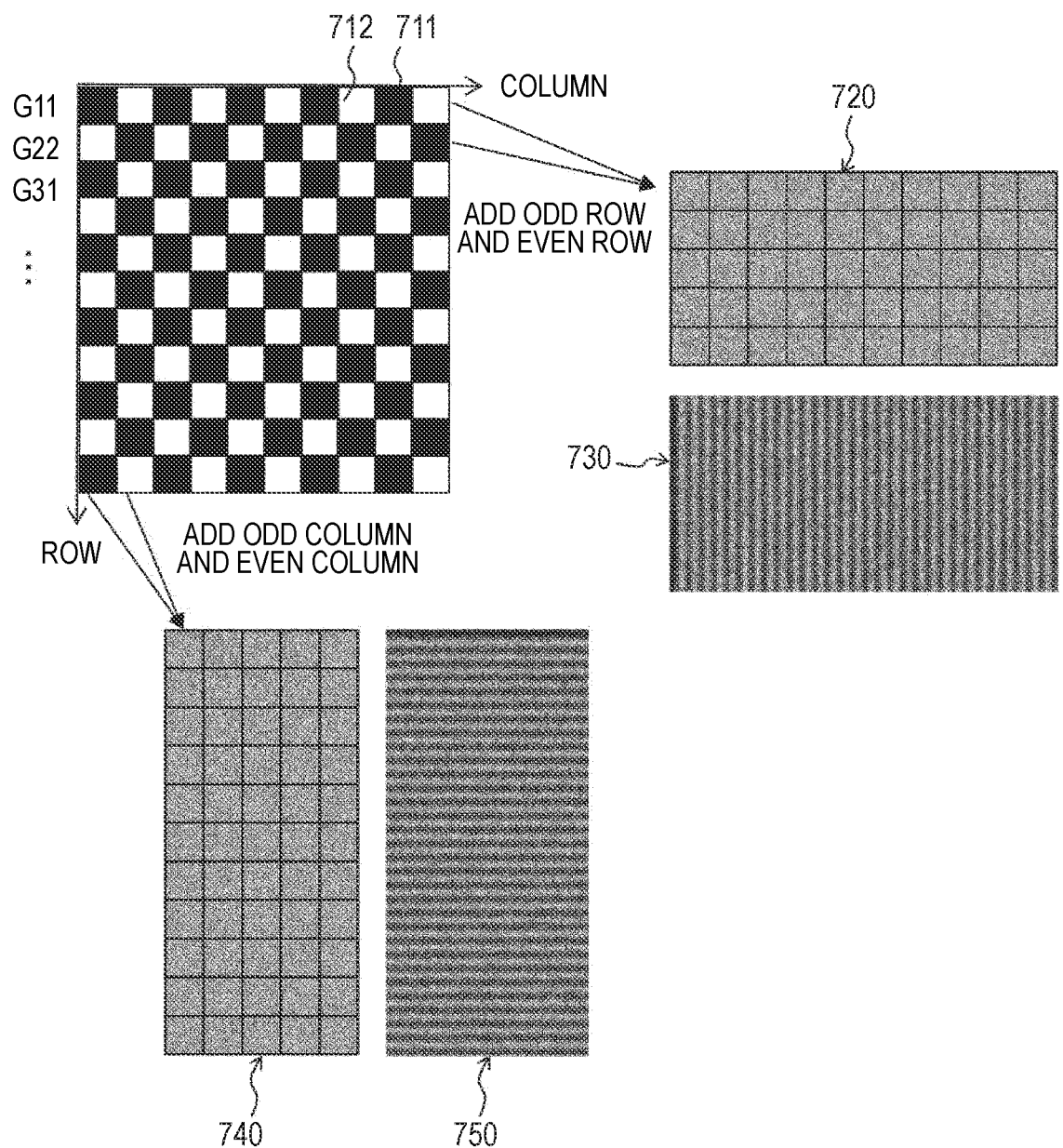
FIG. 7 is a diagram for explaining direction detection of a grid stripe in the radiation imaging system according to the first embodiment of the present invention.

FIG. 7 is a diagram for explaining direction detection of the grid stripe in the radiation imaging system 100 according to the first embodiment of the present invention.

As shown in the upper left of FIG. 7, in the automatic detection of the radiation in the first embodiment, the defect pixels 711 occur in a checkerboard shape (the normal pixels 712 are also shown in the upper left of FIG. 7). Therefore, there is a probability in which this component (pixel value vdriation of every other pixel) is superimposed on the power spectrum and the detection accuracy of the grid stripe deteriorates. Therefore, in the first embodiment, the above-mentioned components are removed by performing binning before detecting the grid stripe.

Specifically, in a case when a vertical grid stripe is detected, for example, the reference pixel determining unit 151 generates an image 720 by adding the pixels of the odd rows and the pixels of the even rows adjacent to each other to convert the odd row and the even row to one row. Such conversion cancels the pixel value vdriation in the checkerboard shape manner. Since the vertical grid stripe is substantially constant in the row direction, the grid stripe to be detected is not lost in a converted image 730.

In a case of detecting a horizontal grid stripe, for example, the reference pixel determining unit 151 generates an image 740 by adding pixels in the odd columns and pixels in the even columns adjacent to each other to convert to the odd column and the even column to one column. Also, in this conversion, since the horizontal grid stripe is substantially constant in the column direction, the grid stripe to be detected is not lost in a converted image 750.

The above-described conversion is performed as preprocessing, and, for example, the reference pixel determining unit 151 detects the grid stripe by the method described in Japanese Patent Application Laid-Open No. 2014-150844. Specifically, in the first embodiment, the direction of the grid stripe is determined by comparing power spectra in the vertical direction (row direction) and the horizontal direction (column direction). At this time, in the first embodiment, as described with reference to FIG. 7, the power spectrum in the vertical direction (row direction) is calculated from data obtained by binning the pixels in the odd columns and the pixels in the even columns. Further, in the first embodiment, as described with reference to FIG. 7, the power spectrum in the horizontal direction (column direction) is calculated from data obtained by binning the pixels in the odd rows and the pixels in the even rows.

Here, the description returns to FIG. 2. If the determination of the reference pixel is completed in step S102 in FIG. 2, the process proceeds to step S103 in FIG. 2. If the processing proceeds to step S103 in FIG. 2, the correction coefficient calculating unit 152 calculates correction coefficients G, D using the reference pixel determined in step S102.

Figure 8A:
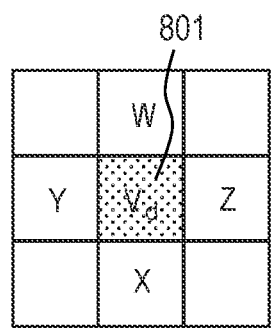
FIG. 8A is a diagram for explaining a method of calculating a correction coefficient by a correction coefficient calculating unit shown in FIG. 1.
Figure 8B:
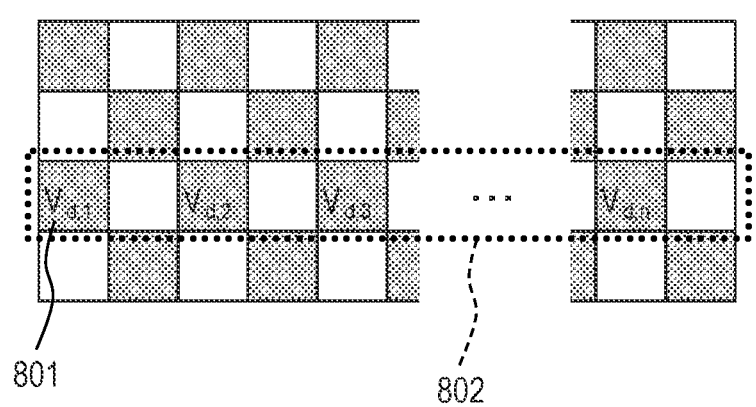
FIG. 8B is a diagram for explaining the method of calculating the correction coefficient by a correction coefficient calculating unit shown in FIG. 1.

In step S103 in FIG. 2, first, the correction coefficient calculating unit 152 determines an estimated value v as a pristine value of a pixel value $v_d$ of the defect pixel by using the reference pixel determined in step S102. FIG. 8A and FIG. 8B are diagrams for explaining a calculation method of the correction coefficient by the correction coefficient calculating unit 152 shown in FIG. 1. For example, when the estimated value v of the defect pixel 801 shown in FIG. 8A is determined, if the reference pixels are two pixels in the vertical direction, the average of the pixel values of the pixels W and X is assumed as the estimated value v. Further, if the reference pixels are two pixels on the horizontal direction, the average of pixel values of the pixels Y and Z is assumed as the estimated value v.

Next, the correction coefficient calculating unit 152 calculates the correction coefficients G, D by regression analysis using the determined $v_d$ and v. As described with reference to FIG. 5, the decrease in the output values is the same at the same driving timing, that is, in each row, but is different in different rows. Therefore, the correction coefficient calculating unit 152 calculates the correction coefficients G, D for each row. Specifically, in a case when correction coefficients for a row 802 shown in FIG. 8B are determined, pixel values of defect pixels 801 shown in gray in FIG. 8B are represented as $\{v_{d,i}|i=1, 2, \ldots, n\}$ and the corresponding estimated values for the defect pixels are represented as $\{v_i| i=1, 2, \ldots, n\}$. The relationship between them is expressed by the following expression (4).

$$v_i = G \cdot (v_{d,i} - D) + D = G \cdot v_{d,i} + D \cdot (1 - G) \quad (4)$$

Here, as shown in the expression (4), the relationship between the estimated value v and the pixel value $v_d$ is expressed by a linear equation with a slope G and an intercept D·(1−G), and the correction coefficients G, D can be calculated by linear regression. For example, when least squares regression is used as a method of the linear regression, a slope "a" and an intercept "b" which minimize the error E expressed by the following expression (5) are determined.

$$E = \sum_{i=1}^{n} (v_i - a \cdot v_{d,i} - b)^2 \quad (5)$$

Then, from the slope a and the intercept b determined from the expression (5), the correction coefficients G and D may be calculated by the following expression (6).

$$G = a, D = \frac{b}{1-a} \quad (6)$$

Although the first embodiment has described a method of calculating the correction coefficients G, D by using the least square regression, the present invention is not limited to this method. The correction coefficients G, D can be calculated in the same manner by using a known method such as MA regression, RMA regression, or the like.

Further, in the first embodiment, the correction coefficients G and D are determined on the assumption that the pristine value of the pixel value $v_d$ of the defect pixel is approximately equal to the estimated value v. However, a pixel in which the assumption cannot be held may be present if there is a steep edge, or the like. Therefore, known robust regression methods such as M estimation, LMedS estimation, RANSAC, or the like, can be used as measures for such outliers.

The calculation method of the correction coefficients G, D for the defect pixels in one row has been described above, but the correction coefficient calculating unit 152 performs the same processing for the defect pixels in all rows to calculate the correction coefficients G, D for each defect pixel. Since the timing when the irradiation of radiation R was started is unknown, it is unknown up to which row the defect rows continue. Therefore, in the first embodiment, the correction coefficients G and D are calculated for all rows, by sequentially tracing rows for which the reset operation has been performed backward from a row for which the reset operation was performed at the time when the irradiation of radiation R was detected. For example, in FIG. 5, the correction coefficients G, D are calculated for scanning lines including the scanning line G51 in which the reset operation is performed at the timing when the irradiation of radiation R is detected, and the scanning lines G42, G31, G22, G11 in order from the scanning line G51. In this regard, the correction coefficients G, D are also calculated for the scanning line G11 that does not actually includes any defect pixel 501.

Here, the description returns to FIG. 2. When the calculation of the correction coefficient is completed in step S103 in FIG. 2, the process proceeds to step S104 in FIG. 2. When the processing proceeds to step S104 in FIG. 2, the pixel correcting unit 153 corrects the correction target pixel that may become the defect pixel in the radiation image by using the correction coefficients G, D calculated in step S103. Specifically, if a pixel value of a defect pixel of a certain row j is represented as $\{v_{d, i, j}|i=1, 2, \ldots, n\}$ and correction coefficients of the row is represented as $G_j$ and $D_j$, the pixel correcting unit 153 calculates a corrected pixel value $v^*_{i, j}$ using the following expression (7).

$$v_{i,j}^* = G_j \cdot (v_{d,i,j} - D_j) + D_j \quad (7)$$

When the processing of step S104 in FIG. 2 is completed, the processing of the flowchart shown in FIG. 2 ends.

In the first embodiment, when correcting the defect pixel (correction target pixel), by determining a pixel that is not affected by the grid stripe as the reference pixel, it is possible to perform highly accurate correction even if the grid is mounted.

The radiation imaging system 100-1 according to the first embodiment described above has the FPD 130, which is a radiation detector including a pixel region 131 in which a plurality of pixels 310 for detecting the radiation R are arranged in a matrix. Specifically, the FPD 130 alternately reads out the electric charge accumulated in a pixel in an odd column or a pixel of an even column in each row in the pixel region 131 to obtain the radiation image. Furthermore, the radiation imaging system 100-1 according to the first embodiment has the image processing unit 150 (image processing apparatus), which performs processing for correcting a defect pixel occurring due to the time difference up to the detection of the radiation R with respect to the radiation image obtained by the FPD 130. The image processing unit 150 has the reference pixel determining unit 151 for determining a reference pixel from among four pixels (pixels in 4-neighbor) vertically and horizontally adjacent to a correction target pixel, which may become the defect pixel in the radiation image obtained by the FPD 130. Further, the image processing unit 150 has the correction coefficient calculating unit 152 for calculating a correction coefficient by using the reference pixel determined by the reference pixel determining unit 151 and the pixel correcting unit 153 for correcting a correction target pixel in the radiation image by using the correction coefficient calculated by the correction coefficient calculating unit 152.

According to such a configuration, it is possible to perform drive such that a normal pixel is always arranged in pixels in a four-neighbor of a correction target pixel, which may become a defect pixel, to determine a pixel having no influence of a grid stripe as a reference pixel from among the pixels in the four-neighbor, and to calculate a correction coefficient. Thus, the defect pixel occurring when the irradiation of radiation is automatically detected to obtain the radiation image can be corrected with high accuracy without being affected by the grid stripe.

Second Embodiment

Next, a second embodiment of the present invention will be described. In the description of the second embodiment described below, matters common to the first embodiment described above will be omitted, and matters different from the first embodiment described above will be described.

Figure 9:
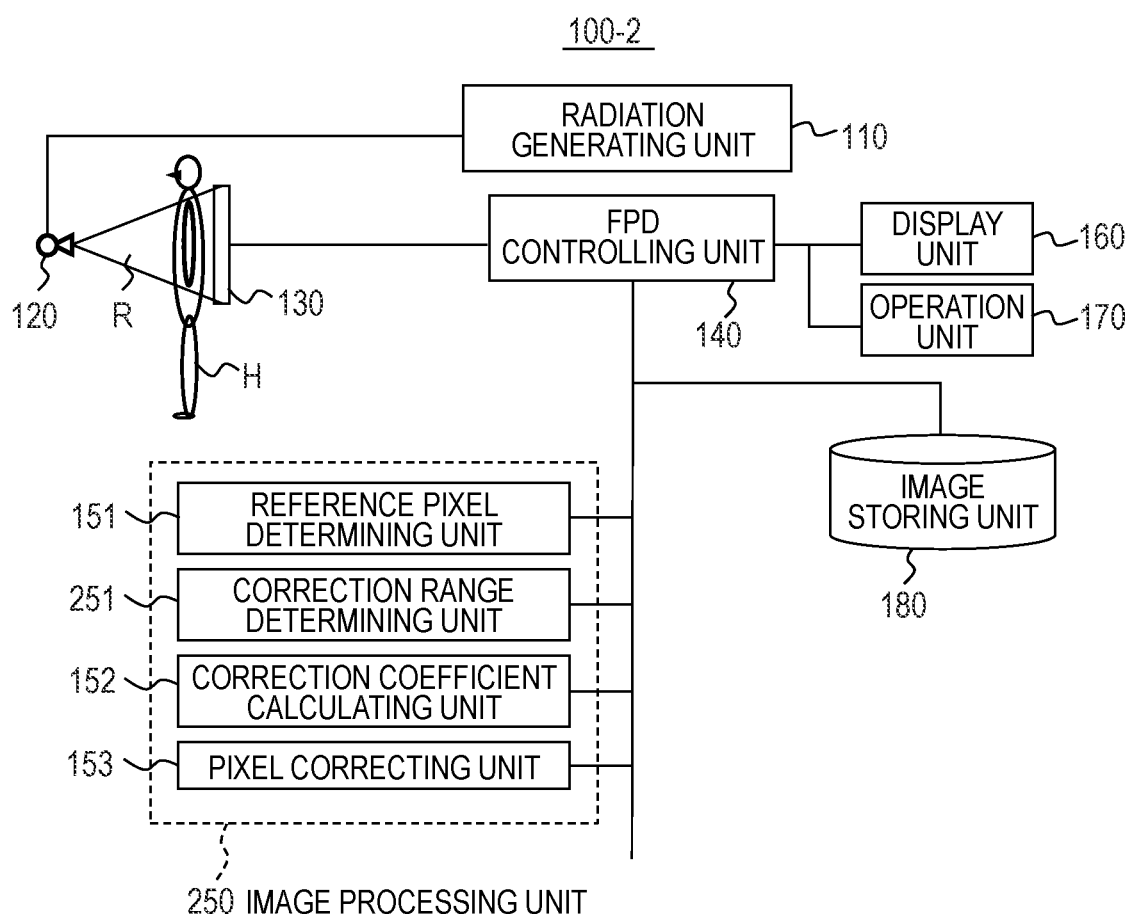
FIG. 9 is a diagram for illustrating an example of a schematic configuration of a radiation imaging system according to a second embodiment of the present invention.

FIG. 9 is a diagram for illustrating an example of a schematic configuration of a radiation imaging system 100 according to the second embodiment of the present invention. Here, the radiation imaging system 100 according to the second embodiment shown in FIG. 9 is referred to as "radiation imaging system 100-2". In FIG. 9, components similar to those shown in FIG. 1 are denoted by the same reference numerals, and a detailed description thereof will be omitted.

The radiation imaging system 100-2 according to the second embodiment shown in FIG. 9 includes an image processing unit 250 further including a correction range determining unit 251, as compared with the radiation imaging system 100-1 according to the first embodiment shown in FIG. 1.

The correction range determining unit 251 is a range determining unit that determines a correction range in the radiation image obtained by the FPD 130, based on a difference or a ratio of pixel values between the reference pixel determined by the reference pixel determining unit 151 and the correction target pixel that may become the defect pixel. The pixel correcting unit 153 corrects the correction target pixel that may become the defect pixel existing in the correction range determined by the correction range determining unit 251. With such a configuration, the radiation imaging system 100-2 can have a function of limiting unnecessary correction and shorten a processing time.

Figure 10:
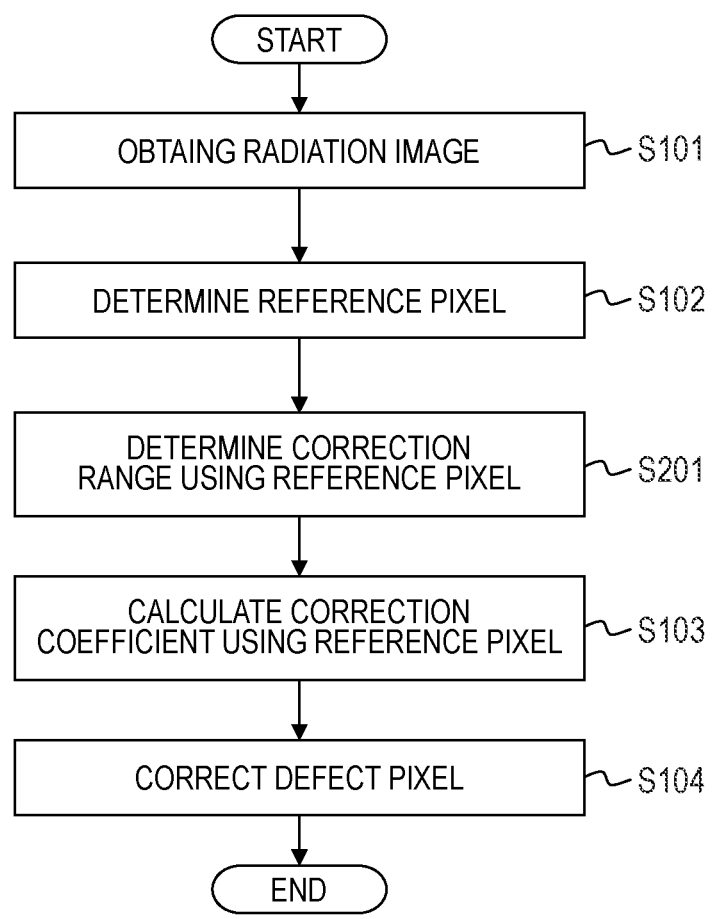
FIG. 10 is a flowchart showing an example of a processing procedure in a control method of the radiation imaging system according to the second embodiment of the present invention.

FIG. 10 is a flowchart showing an example of a processing procedure in a control method of the radiation imaging system 100 according to the second embodiment of the present invention. In FIG. 10, processing steps similar to those shown in FIG. 2 are given the same step numbers, and a detailed description thereof will be omitted.

First, the same processing, as in steps S101 and S102 in the first embodiment shown in FIG. 2, is performed to determine a reference pixel.

Subsequently, in step S201 in FIG. 10, the correction range determining unit 251 determines a correction range in the radiation image obtained by the FPD 130 using the reference pixel determined in step S102.

First, in step S201, the correction range determining unit 251 determines an estimated value v of a pristine value of a pixel value $v_d$ of a defect pixel in the same manner as in step S103 in FIG. 2 described in the first embodiment. More specifically, when the estimated value v of the defect pixel 801 shown in FIG. 8A is determined, if the reference pixels are two pixels in the vertical direction, the average of the pixel values of the pixels W and X is determined as the estimated value v. Further, if the reference pixels are two pixels in the horizontal direction, the average of the pixel values of the pixels Y and Z is determined as the estimated value v.

Next, in step S201, the correction range determining unit 251 determines the correction range based on the ratio ($v/v_d$) between the determined estimated value v of the pristine value and the pixel value $v_d$ of the defect pixel. As described above with reference to FIG. 5, since the decrease in the output value of the defect pixel depends on the time lag from the start of the irradiation of radiation R to the performance of the reset operation, the decrease becomes maximum in a row when the irradiation is detected, and becomes minimum in a row when the irradiation is started. Further, in rows when the reset operation is not performed during irradiation of radiation R, the output value does not decrease.

Figure 11A:
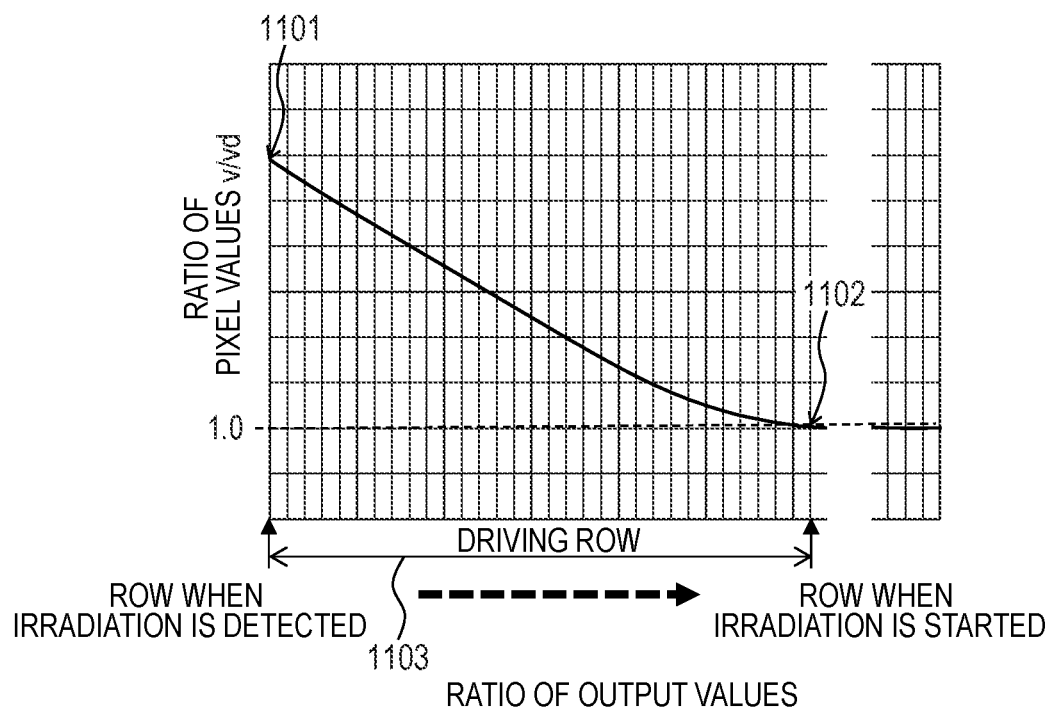
FIG. 11A is a diagram for explaining determination of a correction range by a correction range determining unit shown in FIG. 9.
Figure 11B:
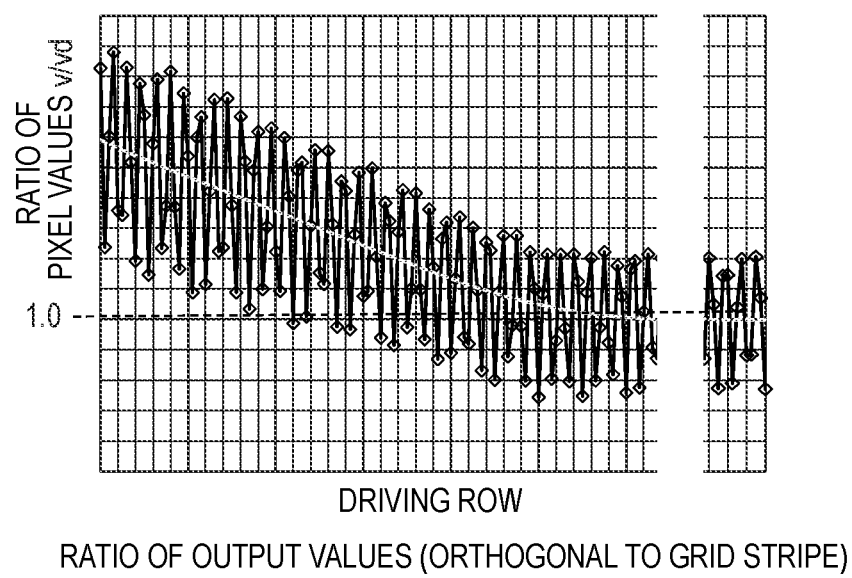
FIG. 11B is a diagram for explaining the determination of the correction range by the correction range determining unit shown in FIG. 9.

FIG. 11A and FIG. 11B are diagrams for explaining the determination of the correction range by the correction range determining unit 251 shown in FIG. 9. As shown in FIG. 11A, if the driving is traced backward from a row 1102 when the irradiation is detected and the ratio of pixel values ($v/v_d$) is graphed, the ratio of the pixel values becomes maximum at the row 1101 when the irradiation is detected, and becomes minimum (the value=1) after a row 1102 when the irradiation is started.

Therefore, as shown in FIG. 11A, the correction range determining unit 251 calculates a row in which the value first become 1 as a row 1102 when the irradiation is started, and determines from the calculated row 1102 when the irradiation is started to the row 1101 when the irradiation is detected as a correction range 1103. As a specific calculation method of the row 1102 when the irradiation is started, first, the number j of the row 1101 when the irradiation is detected is assumed as j=1, and the numbers j of rows of which the driving is traced backward from the row 1101 when the irradiation is detected is assumed as j=2, 3, . . . , m in this order. Then, in a case when a pixel value of a defect pixel in the row j is represented as $\{v_{d,\,i,\,j}|\ i=1, 2, \ldots, n\}$ and the corresponding estimated value of the defect pixel is represented as $\{v_{i,j}|\ i=1, 2, \ldots, n\}$, an error between the ratio ($v/v_d$) and 1.0 is calculated using the following expression (8).

$$E_j = \sqrt{\frac{1}{n} \cdot \sum_{i=1}^{n} \left( \frac{v_{i,j}}{v_{d,i,j}} - 1.0 \right)^2} \quad (8)$$

Then, the correction range determining unit 251 determines a region in which the error falls below a predetermined threshold T as a row in which the reset operation is not performed during the irradiation, that is, a row of which the output value does not decrease. Further, the correction range determining unit 251 calculates the fewest number of rows j in which the error is below the threshold T, that is, a position in which the value (ratio) first becomes 1 in FIG. 11A, as the row 1102 when the irradiation is started.

Here, the threshold T may be empirically determined in consideration of noise, and the like, and is set to 0.001 in the second embodiment. In the second embodiment, the reference pixel is set in the direction parallel to the grid stripe, and the row 1102 when the irradiation is started is determined according to the ratio to the value of the reference pixel, so that the calculation can be performed with high accuracy. For example, FIG. 11B is a graph showing a case when the ratio (v/v_d) is determined from neighboring pixels in a direction orthogonal to the grid stripe. As shown in FIG. 11B, if the ratio is determined in the direction orthogonal to the grid stripe, it becomes difficult to accurately determine the starting row due to the influence of the grid stripe.

Although the second embodiment shows an aspect in which the correction range is determined in the radiation image based on the ratio (v/v_d) of the pixel values between the reference pixel determined by the reference pixel determining unit 151 and the correction target pixel that may become the defect pixel, the method of determining the correction range in the radiation image according to the present invention is not limited to this aspect. For example, an aspect in which the correction range is determined in the radiation image based on the difference in pixel values between the reference pixel determined by the reference pixel determining unit 151 and the correction target pixel that may become the defect pixel is also applicable to the present invention.

Here, the description is returned to FIG. 10 again. If the determination of the correction range is completed in step S201 in FIG. 10, the process proceeds to step S103 in FIG. 10. In step S103 in FIG. 10, the correction coefficient calculating unit 152 calculates the correction coefficients G, D by using the reference pixel determined in step S102 with respect to rows corresponding to the correction range determined in step S201.

Subsequently, in step S104 in FIG. 10, the pixel correcting unit 153 corrects the correction target pixel that may become the defect pixel in the radiation image by using the correction coefficients G, D calculated in step S103 with respect to the rows corresponding to the correction range determined in step S201.

If the processing of step S104 in FIG. 10 is completed, the processing of the flowchart shown in FIG. 10 ends.

In the radiation imaging system 100-2 according to the second embodiment described above, the correction range determining unit 251 determines the correction range in the radiation image based on the ratio (or difference) of the pixel values between the reference pixel determined by the reference pixel determining unit 151 and the correction target pixel that may become the defect pixel.

According to this configuration, in addition to the effects exerted by the first embodiment described above, by limiting the correction range, it is possible to limit the correction of pixels which are not essentially required to be corrected, and to shorten the processing time required for the correction.

Third Embodiment

Next, a third embodiment of the present invention will be described. In the description of the third embodiment described below, matters common to the first and second embodiments described above will be omitted, and matters different from the first and second embodiments described above will be described.

Figure 12:
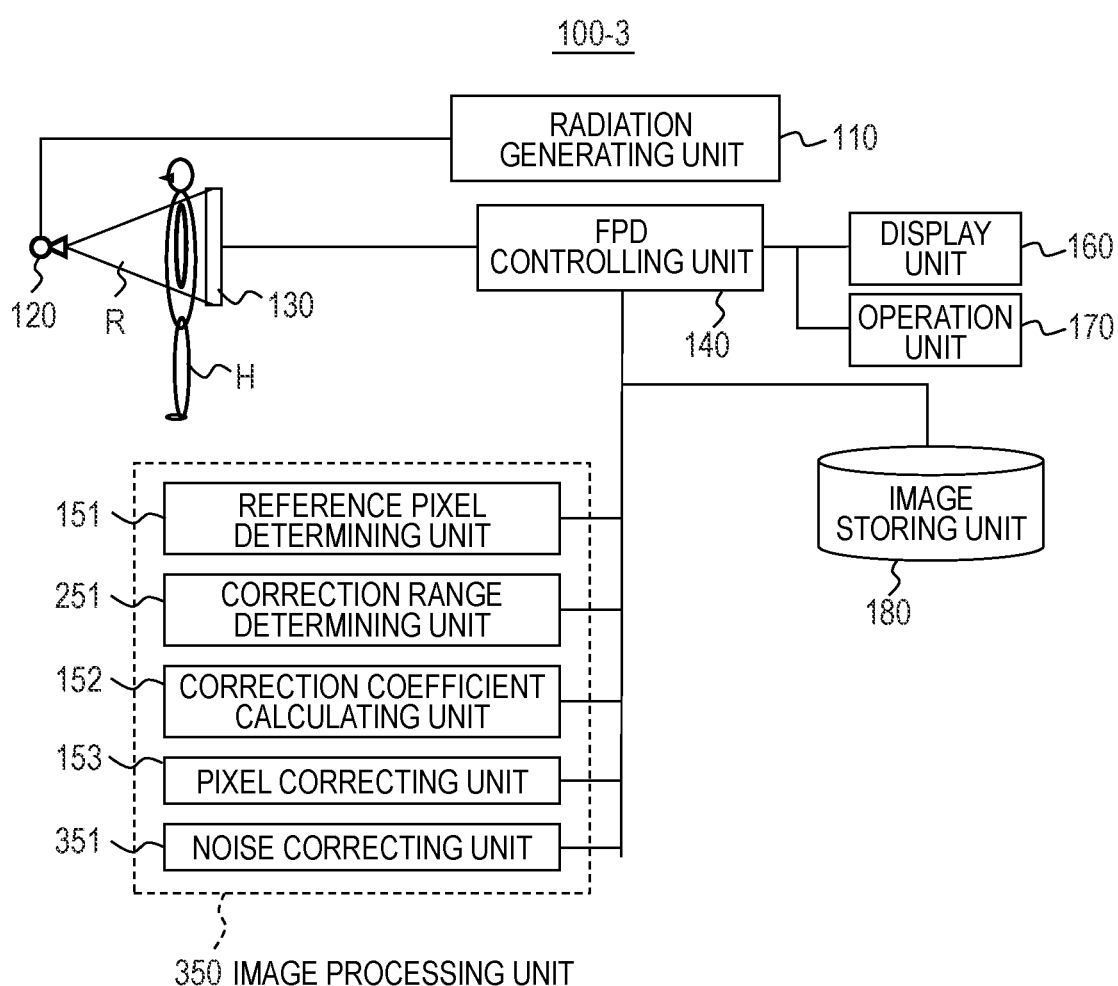
FIG. 12 is a diagram for illustrating an example of a schematic configuration of a radiation imaging system according to a third embodiment of the present invention.

FIG. 12 is a diagram for illustrating an example of a schematic configuration of a radiation imaging system 100 according to the third embodiment of the present invention. Here, the radiation imaging system 100 according to the third embodiment shown in FIG. 12 is referred to as "radiation imaging system 100-3". In FIG. 12, components similar to those shown in FIG. 1 and FIG. 9 are denoted by the same reference numerals, and a detailed description thereof is omitted.

The radiation imaging system 100-3 according to the third embodiment shown in FIG. 12 includes an image processing unit 350 further including a noise correcting unit 351, as compared with the radiation imaging system 100-2 according to the second embodiment shown in FIG. 9.

The noise correcting unit 351 is a noise correcting unit that corrects a noise level of the pixel corrected by the pixel correcting unit 153 using the reference pixel determined by the reference pixel determining unit 151. Specifically, in the third embodiment, the noise correcting unit 351 corrects the above-mentioned noise level by performing weighted addition of the pixel value of the reference pixel based on amplification amount of the noise caused by the correction by the pixel correcting unit 153. With such a configuration, it is possible to suppress deterioration of graininess caused by the correction.

Figure 13:
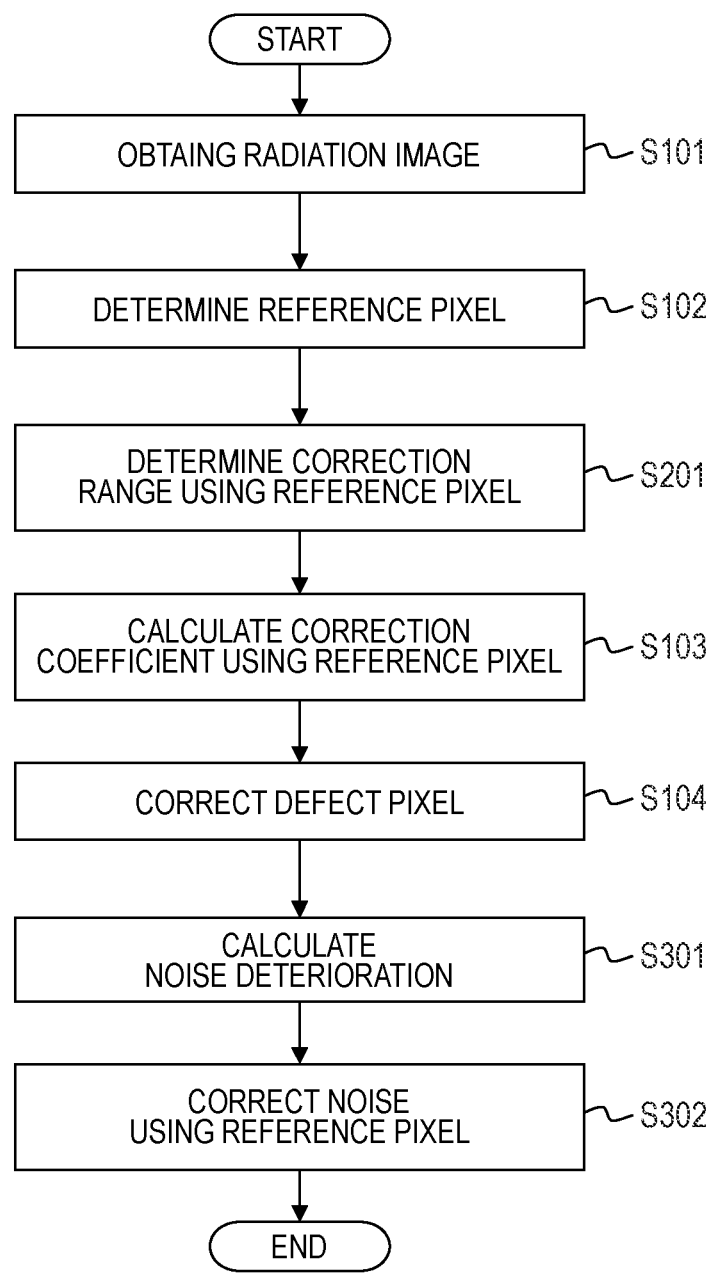
FIG. 13 is a flowchart showing an example of a processing procedure in a control method of the radiation imaging system according to the third embodiment of the present invention.

FIG. 13 is a flowchart showing an example of a processing procedure in a control method of the radiation imaging system 100 according to the third embodiment of the present invention. In FIG. 13, processing steps similar to those shown in FIG. 2 and FIG. 10 are given the same step numbers, and a detailed description thereof is omitted.

First, the same processing as in steps S101, S102, S201, S103 and S104 in the second embodiment shown in FIG. 10 are performed to correct the correction target pixel that may become the defect pixel in the radiation image by using the correction coefficients G, D calculated in step S103.

Then, in step S301 in FIG. 13, the noise correcting unit 351 calculates the deterioration of the noise caused by the correction in step S104. Normally, the noise level superimposed on the output of each pixel 310 is dominated by quantum noise proportional to the radiation dose X of the radiation R incident on the pixel 310 and system noise inherent in the system independent of the radiation dose. In a case when a standard deviation of the quantum noise is represented as $\sigma_Q$ and a standard deviation of the system noise is represented as $\sigma_S$, a standard deviation $\sigma$ of the noise superimposed on the output of each pixel 310 is expressed by the following expression (9) in accordance with the additivity of variance.

$$\sigma = \sqrt{\sigma_Q^2 \cdot X + \sigma_S^2} \quad (9)$$

On the other hand, in the defect pixel, a part of the radiation dose X incident on the pixel 310 is lost by the reset operation, and the radiation dose contributing to the output decreases by a factor of 1/G. Therefore, a standard deviation Ga of the noise superimposed on the output of the defect pixel is expressed by the following expression (10).

$$\sigma_d = \sqrt{\sigma_Q^2 \cdot \frac{X}{G} + \sigma_S^2} \quad (10)$$

In the defect pixel corrected by the pixel correcting unit 153, a signal component included in the output value of the pixel 310 is multiplied by G, and the noise is simultaneously multiplied by G. That is, a standard deviation $\sigma_C$ of the noise superimposed on the corrected output value of the defect pixel is expressed by the following expression (11).

$$\sigma_c = G \cdot \sigma_d = \sqrt{G \cdot \sigma_Q^2 \cdot X + G^2 \cdot \sigma_S^2} \quad (11)$$

Therefore, the noise level $\sigma_c$ included in the corrected output value of the defect pixel becomes larger than the noise level $\sigma$ included in the normal pristine output value, and the deterioration becomes $\sigma_c/\sigma$. Therefore, for all corrected defect pixels, $\sigma_c/\sigma$ is calculated as noise deterioration W by the following expression (12).

$$W = \sqrt{\frac{G \cdot \sigma_Q^2 \cdot X + G^2 \cdot \sigma_S^2}{\sigma_Q^2 \cdot X + \sigma_S^2}} \quad (12)$$

Here, in the expression (12), $\sigma_Q$ and $\sigma_S$ are values uniquely determined according to the imaging system, and values thereof calculated in advance may be held in advance and used. radiation amount X of the incident radiation R can be calculated by using the relationship of the above expression (1). Specifically, in a case when a pixel value in the i row and the j column in the corrected image I is represented as I(i, j), the radiation dose X(i, j) of the radiation R incident on each pixel can be individually calculated by the following expression (13).

$$X(i, j) = \frac{\bar{I}(i, j) - D}{A}, \; \bar{I}(i, j) = \frac{1}{(2 \cdot N + 1)^2} \sum_{\Delta i=-N}^{N} \sum_{\Delta j=-N}^{N} I(i + \Delta i, j + \Delta j) \quad (13)$$

Here, in the expression (13), N corresponding to value for determining a filter size for removing the influence of the noise, and the N is set to, for example, two, in third embodiment. In the expression (13), A is a proportional constant for converting the radiation dose X into a pixel value I, and is a value uniquely determined according to the sensor. Therefore, the value calculated in advance may be held in advance, and used.

Subsequently, in step S302 in FIG. 13, the noise correcting unit 351 performs noise correction using the reference pixel determined in step S102, based on the deterioration W of the noise calculated in step S301. Here, it is assumed that the noise levels of the reference pixel determined by the reference pixel determining unit 151 and the defect pixel are essentially the same, and the noise level of the defect pixel is corrected to be substantially equivalent to that of the reference pixel.

In the third embodiment, the noise of the corrected defect pixel is corrected by performing the weighted addition (filtering) of three points of the defect pixel and the reference pixels (two pixels in the vertical direction or two pixels in the horizontal direction) determined by the reference pixel determining unit 151. Specifically, in a case when the corrected pixel value of the defect pixel is represented as V and the pixel values of the two reference pixels are represented as V1 and V2, respectively, the noise of defect pixel is corrected according to the following expression (14).

$$V_N = a \cdot V + \frac{1-a}{2} \cdot (V1 + V2) \quad (14)$$

In the expression (14), "a" is a weight coefficient for determining the degree of noise reduction, and the weight coefficient is set so that the corrected noise level of the defect pixel V is substantially equivalent to the noise levels of the reference pixels V1 and V2. Hereafter, a method for determining the weight coefficient a in the expression (14) will be described.

First, in a case when a standard deviation of $\sigma_T$ noise superimposed on the corrected output of the defect pixel V is represented as Or and a standard deviation of the noise superimposed on the output of the reference pixel is represented as $\sigma_R$, a standard deviation $\sigma$ of the noise superimposed on the defect pixel VN after the noise correction is expressed by the following expression (15).

$$\sigma^2 = a^2 \cdot \sigma_T^2 + \frac{(1-a)^2}{2} \cdot \sigma_R^2 \quad (15)$$

The condition for the noise level of the defect pixel VN after the noise correction to become substantially equivalent to the noise level of the reference pixels V1, V2 is expressed by the following expression (16).

$$\sigma = \sigma_R \quad (16)$$

Further, the relationship between the standard deviations $\sigma_T$ and $\sigma_R$ is expressed by the following expression (17) according to the above-mentioned noise deterioration W.

$$\sigma_R = \frac{\sigma_T}{W} \quad (17)$$

Here, if the expressions (16) and (17) are substituted into the expression (15), the following expression (18) is obtained.

$$(2 \cdot W^2 + 1) \cdot a^2 - 2 \cdot a - 2 = 0 \quad (18)$$

Therefore, the weight coefficient a satisfying the condition of the expression (18) is expressed by the following expression (19) by solving the expression (18) for the weight coefficient a.

$$a = \frac{1 + \sqrt{2 \cdot W^2 + 2}}{2 \cdot W^2 + 1} \quad (19)$$

Here, in the expression (19), the weight coefficient a is a value depending on the noise deterioration W. Therefore, the weight coefficient a for each pixel is calculated based on the deterioration for each pixel calculated in step S301 in FIG. 13, and the noise correction is performed by using the expression (14). In the third embodiment, the reference pixels are set in a direction parallel to the grid stripe, and the noise correction is performed by the weighted addition with the reference pixels. Therefore, the graininess can be improved without deteriorating components of the grid stripe.

In the radiation imaging system 100-3 according to the third embodiment described above, the noise correcting unit 351 corrects the noise level of the pixel corrected by the pixel correcting unit 153 using the reference pixel determined by the reference pixel determining unit 151. Specifically, in the third embodiment, the noise correcting unit 351 corrects the above-mentioned noise level by performing the weighted addition of the pixel value of the reference pixel based on the amplification amount of the noise caused by the correction by the pixel correcting unit 153.

According to the configuration, the noise level amplified by the correction of the correction target pixel that may become the defect pixel can also be corrected, and feeling of strangeness of the image quality caused by the difference in the graininess as well as the difference in output values can be improved.

According to the first to third embodiments, the defect pixel occurring when the irradiation of radiation is automatically detected and the radiation image is obtained can be accurately corrected, without being affected by the grid stripe.

Other Embodiment

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus performing a processing of correcting a correction target pixel in a radiation image obtained by using a radiation detector that includes a pixel region in which a plurality of pixels configured to detect radiation are provided in a matrix, the image processing apparatus comprising:
   at least one processor; and
   a memory coupled to the at least one processor, the memory storing instructions that, when executed by the processor, causes the at least one processor to function as:
      a pixel determination unit configured to determine a reference pixel from among four pixels vertically and horizontally adjacent to the correction target pixel in the radiation image; and
      a pixel correcting unit configured to correct the correction target pixel in the radiation image using the reference pixel,
   wherein the radiation detector obtains the radiation image by repeating (a) an operation of reading out a charge accumulated in the pixels of one of an odd column and an even column of a first row and (b) an operation of reading out a charge accumulated in the pixels of the other of the odd column and the even column of a second row adjacent to the first row, and
   wherein the image processing apparatus corrects the pixels of the one of the odd column and the even column of the first row and the pixels of the other of the odd column and the even column of the second row as the correction target pixel in the radiation image.

2. The image processing apparatus according to claim 1, wherein the pixel determination unit is further configured to determine a first pixel group vertically adjacent to the correction target pixel or a second pixel group horizontally adjacent to the correction target pixel in the radiation image as the reference pixel.

3. The image processing apparatus according to claim 2, wherein the pixel determination unit is configured to determine, as the reference pixel, a pixel group having a smallest difference of pixel values from the correction target pixel from between the first pixel group and the second pixel group.

4. The image processing apparatus according to claim 2, wherein the pixel determination unit is further configured to determine the first pixel group as the reference pixel if a grid stripe occurring in the radiation image is in a vertical direction, and determines the second pixel group as the reference pixel if the grid stripe occurring in the radiation image is in a horizontal direction.

5. The image processing apparatus according to claim 4, wherein a direction of the grid stripe is determined by comparing power spectra in the vertical direction and the horizontal direction.

6. The image processing apparatus according to claim 5, wherein the power spectrum in the vertical direction is calculated from data obtained by binning a pixel in the odd column and a pixel in the even column that are adjacent to each other, and the power spectrum in the horizontal direction is calculated from data obtained by binning a pixel in an odd row and a pixel in an even row that are adjacent to each other.

7. The image processing apparatus according to claim 1, wherein the at least one processor is further caused to function as a range determination unit configured to determine a correction range in the radiation image based on a difference or a ratio of pixel values between the reference pixel determined by the pixel determination unit and the correction target pixel, wherein the pixel correcting unit is further configured to perform the correction on the correction target pixel existing in the correction range.

8. The image processing apparatus according to claim 1, wherein the at least one processor is further caused to function as a noise correction unit configured to correct a noise level of a pixel corrected by the pixel correcting unit using the reference pixel.

9. The image processing apparatus according to claim 8, wherein the noise correction unit is further configured to correct the noise level by performing weighted addition of a pixel value of the reference pixel based on an amplification amount of noise caused by the correction by the pixel correcting unit.

10. The image processing apparatus according to claim 1, wherein the pixel correcting unit is further configured to correct the correction target pixel in the radiation image using a correction coefficient obtained using the reference pixel.

11. The image processing apparatus according to claim 1, wherein the pixel determination unit is further configured to determine the reference pixel using a defect pixel occurring due to a time difference up to detection of the radiation as the correction target pixel.

12. A radiation imaging system comprising:
the image processing apparatus according to claim 1; and
the radiation detector.

13. An image processing method of performing processing of correcting a correction target pixel in a radiation image obtained by using a radiation detector that includes a pixel region in which a plurality of pixels configured to detect a radiation are provided in a matrix, the image processing method comprising:
a pixel determination step of determining a reference pixel from among four pixels vertically and horizontally adjacent to the correction target pixel in the radiation image; and
a pixel correcting step of correcting the correction target pixel in the radiation image using the reference pixel,
wherein the radiation detector obtains the radiation image by repeating (a) an operation of reading out a charge accumulated in the pixels of one of an odd column and an even column of a first row and (b) an operation of reading out a charge accumulated in the pixels of the other of the odd column and the even column of a second row adjacent to the first row, and
wherein the pixel correcting step includes correcting the pixels of the one of the odd column and the even column of the first row and the pixels of the other of the odd column and the even column of the second row as the correction target pixel in the radiation image.

14. A non-transitory computer-readable storage medium having stored thereon a program that, when executed by a computer, causes the computer to perform the steps of the image processing method according to claim 13.

* * * * *